US 9,373,982 B2

(12) United States Patent
Wu et al.

(10) Patent No.: US 9,373,982 B2
(45) Date of Patent: Jun. 21, 2016

(54) ELECTRICAL MACHINE HAVING PARTIALLY PARALLEL SLOTS AND TEETH

(71) Applicant: SIEMENS AKTIENGESELLSCHAFT, München (DE)

(72) Inventors: Lijian Wu, Ikast (DK); Zhen Ping Xia, Sheffield (GB)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/280,720

(22) Filed: May 19, 2014

(65) Prior Publication Data

US 2014/0346919 A1 Nov. 27, 2014

(30) Foreign Application Priority Data

May 23, 2013 (EP) ..................................... 13168963

(51) Int. Cl.
*H02K 1/16* (2006.01)
*H02K 1/12* (2006.01)
*H02K 1/26* (2006.01)
(Continued)

(52) U.S. Cl.
CPC .................. *H02K 1/165* (2013.01); *H02K 1/12* (2013.01); *H02K 1/16* (2013.01); *H02K 1/265* (2013.01); *H02K 3/12* (2013.01); *H02K 3/18* (2013.01); *Y02E 10/725* (2013.01)

(58) Field of Classification Search
CPC ......... H02K 1/165; H02K 1/265; H02K 1/12; H02K 1/16; H02K 3/12; H02K 3/18; H02K 3/46; H02K 3/48; Y02E 10/725

USPC ................... 310/216.069, 216.071, 216.072, 310/216.073, 216.074, 179, 180
See application file for complete search history.

(56) References Cited

U.S. PATENT DOCUMENTS 1,943,432 A    1/1934 Grob
5,644,181 A *  7/1997 Kooken et al. ......... 310/216.069
(Continued)

FOREIGN PATENT DOCUMENTS

JP    S57118646 U    7/1982
JP    2008160939 A *  7/2008

OTHER PUBLICATIONS

Tanahashi, Noritoshi, Stator Core, Jul. 10, 2008, Toyota Motor Corp, JP2008160939.*

(Continued)

*Primary Examiner* — Terrance Kenerly
*Assistant Examiner* — Alexander Singh
(74) *Attorney, Agent, or Firm* — Schmeiser Olsen & Watts LLP

(57) ABSTRACT

A tubular body for an electrical machine is provided. The tubular body comprises a curved surface area, a first tooth and a second tooth. The tubular body is arrangable with respect to a further tubular body such that one of the tubular body or the further tubular body is rotatable with respect to the other one around a rotary axis. The first tooth and the second tooth extend from the curved surface area along a radial direction with respect to the rotary axis. The first tooth comprises a first side wall facing a second side wall of the second tooth, wherein the first side wall comprises a first section which is parallel to the second side wall such that a circumferential distance between the first section and the second side wall is constant along the radial direction.

8 Claims, 5 Drawing Sheets

(51) Int. Cl.
 *H02K 3/12* (2006.01)
 *H02K 3/18* (2006.01)

(56) References Cited

U.S. PATENT DOCUMENTS

| | | | | |
|---|---|---|---|---|
| 7,049,725 B2 * | 5/2006 | Blouin | ............... | H02K 1/165 310/216.012 |
| 8,766,506 B2 * | 7/2014 | Sano et al. | ............ | 310/216.073 |
| 2002/0158543 A1 * | 10/2002 | Wolters | ................... | 310/254 |
| 2009/0174280 A1 * | 7/2009 | Prudham | ................ | 310/216.022 |
| 2010/0019589 A1 * | 1/2010 | Saban | ..................... | H02K 1/02 310/52 |
| 2012/0326552 A1 | 12/2012 | Nishio | | |

OTHER PUBLICATIONS

European Search Report dated Feb. 18, 2014; Application No. 13168963.0; Siemens Aktiengesellschaft; 8 pgs.

\* cited by examiner

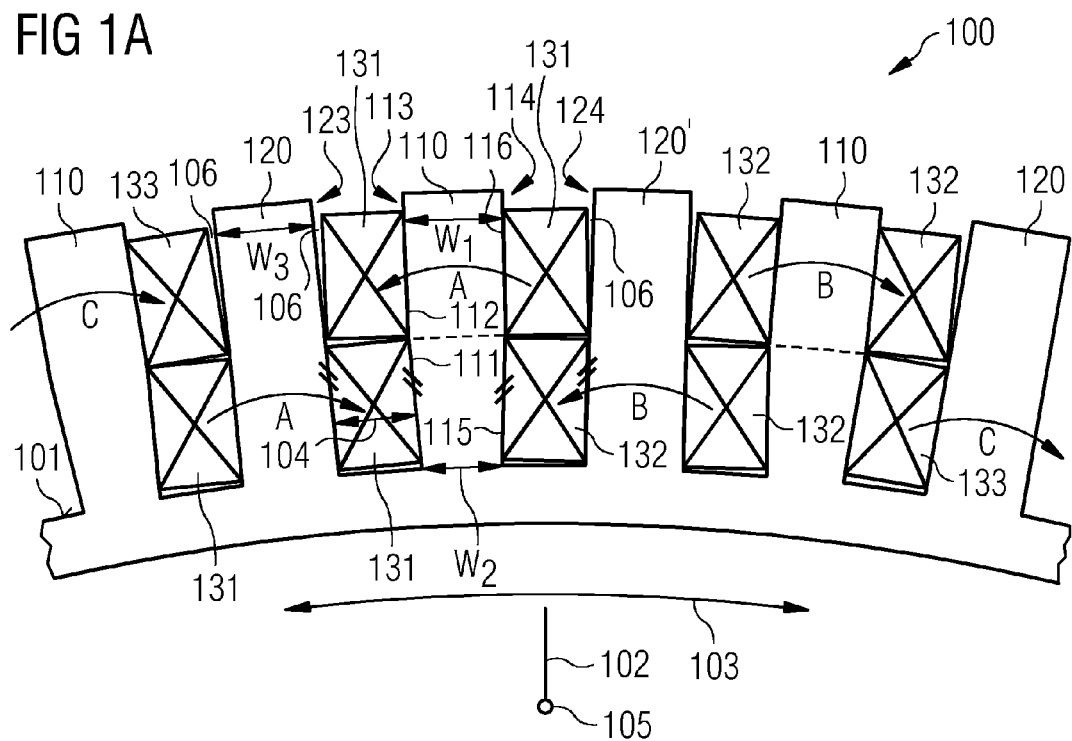
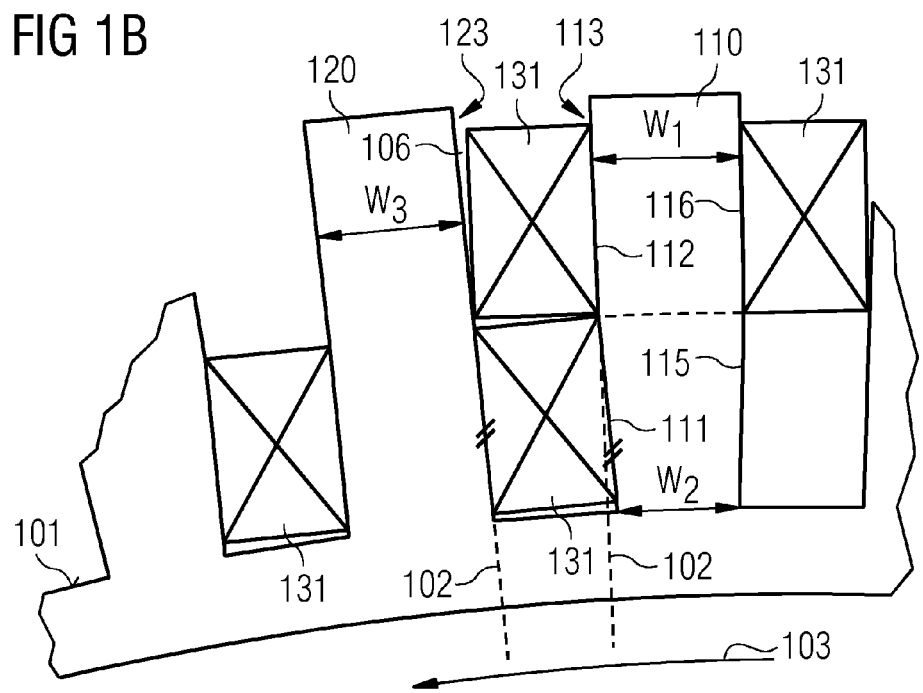

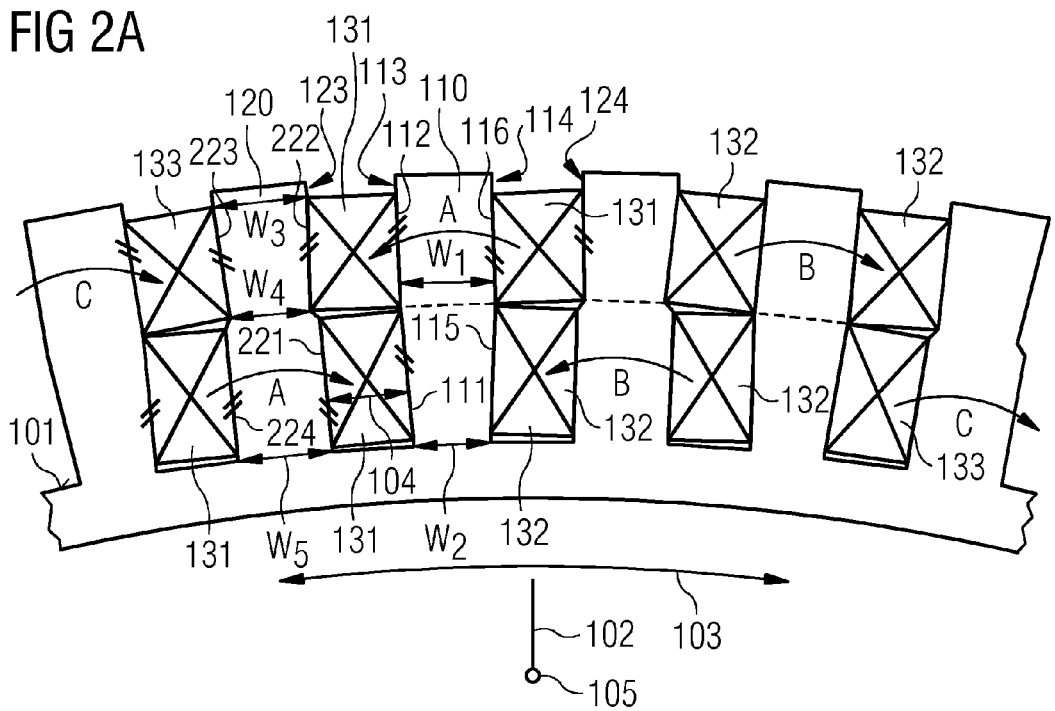
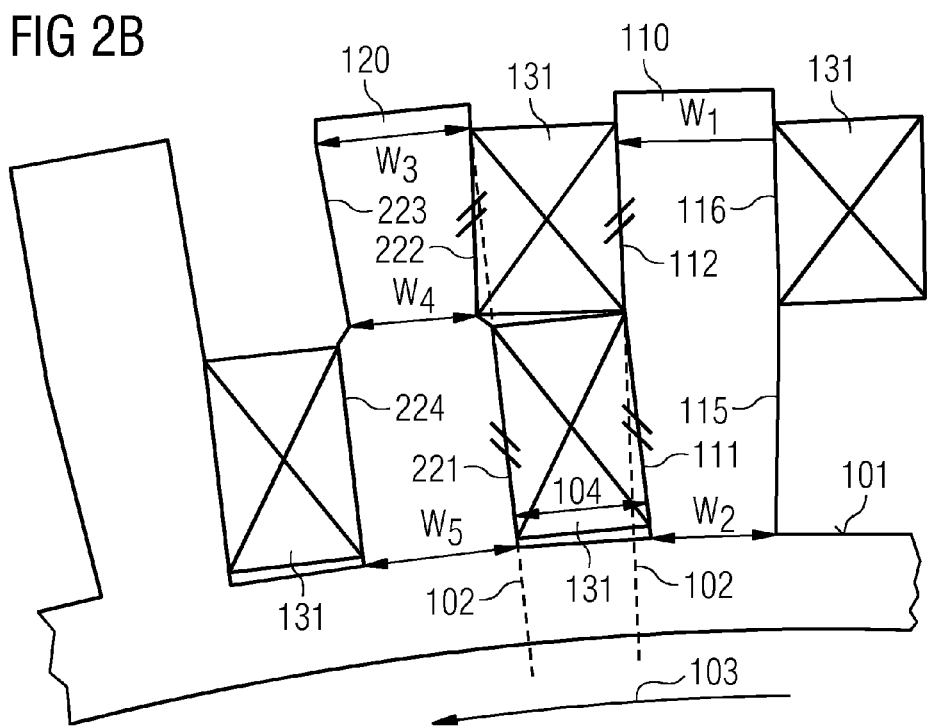

direction around this rotary axis. The first tooth may comprise a first (circumferential) side wall facing a second (circumferential) side wall of the second tooth.

The first (circumferential) side wall may comprise a first section which may be parallel to the second (circumferential) side wall such that a circumferential distance (i.e. a slot width) between the first section and the second (circumferential) side wall may be constant along the radial direction.

According to a further aspect, an electrical machine is presented. The electrical machine may comprise at least one winding and a tubular body as described above. The at least one winding may be wound around the respective first and second teeth of the tubular body.

The electrical machine may be for example an electrical motor or a generator, for example a reluctance motor type. The electrical machine may be a wind power generator of a wind turbine.

The electrical machine may comprise the above described tubular body which may be a rotor or a stator. A respective stator for the electrical machine may be for example a respective stator which surrounds the (internal) rotor of the electrical machine or may be a stator which is surrounded by the (external) rotor of the electrical machine.

A respective tubular body, i.e. a stator or a rotor, generally may comprise a tubular profile with a ring-shaped cross-sectional shape. The tubular body may comprise a center axis which is generally coaxial with a rotary axis of the rotor (e.g. the tubular body itself or the further tubular body) of the electrical machine. A circumferential direction may be defined around the rotary axis and, for example, along the curved surface area of the tubular profile of the tubular body. Furthermore, a radial direction may run from the tubular body to the rotary axis, wherein the radial direction may be perpendicular to the circumferential direction and the rotary axis and may run through the rotary axis.

The respective winding may be connected to an electrical circuitry. For example, a plurality of windings may be wound around the respective first and/or second teeth. The windings may be grouped and may be connected to a three-phase or a multiple phase electrical power circuitry.

The first (circumferential) side wall of the first tooth and the second (circumferential) side wall of the second tooth may form together a slot between each other, into which a winding may be arrangeable. The winding generally may comprise a rectangular cross-section and, hence, plane circumferential side walls. The circumferential side walls of the respective winding may abut against the first section of the first circumferential side wall and the second circumferential side wall within the slot.

The respective side walls may be circumferential side walls which means that a respective side wall may delimit the respective tooth in the circumferential direction.

In conventional approaches, the slot often comprises a non-constant circumferential distance between a slot opening and a slot bottom, because the teeth forming the slot ordinarily comprise a similar width and extends along the radial direction.

By the present approach, a first section of the first circumferential side wall of the first tooth may be formed parallel with a second section or the complete second circumferential side wall. Hence, the first section may be non-parallel with a respective radial direction running from a point onto the first section of the first circumferential side wall to the rotary axis. In other words, the first section of the first circumferential side wall may be arranged within a plane which has a normal. The normal of the plane may be non-rectangular with the radial direction of a line running from a point onto the plane

ELECTRICAL MACHINE HAVING PARTIALLY PARALLEL SLOTS AND TEETH

CROSS-REFERENCE TO RELATED APPLICATIONS

This application claims priority to EP Application No. 13168963.0, having a filing date of May 23, 2013, the entire contents of which are hereby incorporated by reference.

FIELD OF TECHNOLOGY

The following relates to a tubular body for an electrical machine, wherein the tubular body comprises first and second teeth which have partially parallel teeth surfaces.

BACKGROUND

Generally, an electrical machine, such as an electric motor or an electric generator, comprises a tubular shaped rotor and a tubular shaped stator. The stator typically comprises stator teeth which extend along a radial direction with respect to a rotary axis of the rotor. Each stator tooth ordinarily comprises circumferential surfaces which are all directed along the radial direction. The teeth are often arranged one after another along a circumferential direction. Hence, if each tooth has the same width and extends along the radial direction, the adjacent sides of adjacent teeth are not parallel with respect to each other.

For example, for a common external rotor machine, a slot between two adjacent teeth has a slot opening with a larger width than a width at the slot bottom.

FIG. 7 shows such a conventional stator 700. The conventional stator 700 comprises teeth 710, 720 which are arranged one after another along a circumferential direction. The first stator tooth 710 and the second stator tooth 720 comprise the same constant width and extends along a radial direction of the conventional stator 700. Because the width of the first and second conventional teeth 710, 720 is constant, the slots between the respective conventional teeth 710, 720 comprise different circumferential width, i.e. a slot opening comprises a larger width than the slot bottom.

As can be taken from FIG. 7, the respective coils of the windings, which generally have a rectangular shape/cross-section, can only smoothly abut with a circumferential side wall of one of the adjacent teeth 710, 720. At an opposed side, a gap 701 exists. Such gap 701 negatively affects the efficiency of an electrical machine.

SUMMARY

The described aspects relate to improving the efficiency of an electrical machine.

Such improvement is provided, inter alia, by a tubular body for an electrical machine and by an electrical machine comprising the tubular body according to the independent claims.

According to a first aspect, a tubular body for an electrical machine is presented. The tubular body comprises a curved surface area. The tubular body (e.g. a stator) may be arranged with respect to a further tubular body (e.g. a rotor) such that the tubular body or the further tubular body may be rotatable with respect the other one around a rotary axis.

The tubular body may further comprise a first tooth and a second tooth. The first tooth and the second tooth may extend from the curved surface area along a radial direction with respect to the rotary axis. The first tooth and the second tooth may be spaced apart from each other along a circumferential to the rotary axis. Hence, the cross-section of the slot which may be formed by the first section of the first circumferential side wall and the second circumferential side wall may comprise a rectangular shape with parallel circumferentially opposed sides. Hence, the (rectangular) winding may align and abut onto the first section and at the same time with an opposed circumferential side with the second circumferential side wall of the second tooth. Hence, air gaps between the winding and the respective circumferential side walls of the first tooth and the second tooth may be reduced or prevented.

Without the air gaps along the circumferential direction between the windings and the respective circumferential side walls of the first and second teeth, the efficiency of an electrical machine comprising the tubular body may be increased.

By forming the first section of the first circumferential side wall parallel to the adjacent second circumferential side wall, a full use of the slot area between the first and the second teeth may be achieved. Furthermore, the overall slot area may be increased because no or only small unused air gaps within the slot exist. Hence, the winding resistance and copper loss may be reduced and the efficiency may be improved.

According to a further exemplary embodiment, the first circumferential side wall may comprise a further first section which may be located adjacent to the first section along the radial direction. In other words, a plurality of first sections and further first sections of the first tooth may be arranged one after another along the radial direction, wherein each first section may comprise a different alignment with respect to each other and with respect to the radial direction.

In this context, in an exemplary embodiment, the further first section may be located between the curved surface area and the first section. Alternatively, the first section may be located between the curved surface area and the further first section.

According to a further exemplary embodiment, the second circumferential side wall comprises a second section which may be parallel with the first section. The further first section may be non-parallel with the second section such that a circumferential distance between the further first section and the second circumferential side wall may vary along the radial direction. Hence, a slot which may be formed between the first circumferential side wall and the second circumferential side wall may comprise a slot section with a constant circumferential distance along the radial direction between the first section and the second section, wherein the circumferential distance between the further first section and the second section increases along the radial direction.

According to a further exemplary embodiment, the second circumferential side wall may comprise a further second section which may be parallel with the further first section. Hence, the two adjacent first and second teeth may form a slot between each other, which may comprise, along the radial direction, different slot sections of a constant width.

According to a further exemplary embodiment, the tubular body may comprise a further second tooth which may extend from the curved surface area along the radial direction such that the first tooth may be arranged along the circumferential direction between the second tooth and the further second tooth. The first tooth may further comprise a further first circumferential side wall facing a further second circumferential side wall of the further second tooth. The further first circumferential side wall may comprise a third section which may be parallel to the further second circumferential side wall such that a circumferential distance between the third section and the further second circumferential side wall may be constant along the radial direction.

The further second side wall of the further second tooth may comprise a similar design as the second side wall of the second tooth, i.e. the further second side wall may comprise, for example, two or more further second sections, which may be aligned differently with respect to each other.

Hence, along the circumferential direction, the respective circumferential side walls and its respective sections, respectively, may be aligned with respect to each other such that each slot may be formed by sections of parallel circumferential side walls.

Accordingly, according to a further exemplary embodiment, the tubular body may comprise a plurality of first teeth and a plurality of second teeth. The plurality of first teeth and the plurality of second teeth may extend from the curved surface area along the radial direction with respect to the rotary axis.

The first teeth and the second teeth may be arranged one after another along the circumferential direction in an alternating manner.

Hence, by the presently embodied design of the tubular body for the electrical machine, the efficiency may be increased and the winding loss may be significantly reduced. The gaps in the slots between the windings and the circumferential side walls of the teeth may be additionally filled with further windings so that the slot filling factor may be improved. With the same slot opening width, the slot area may be increased. This may result in a smaller winding resistance, smaller copper/aluminium winding loss and respectively a higher efficiency. The benefit of the presented embodiments may depend on the slot number and slot depth. In an exemplary embodiment, the effective slot area can be increased by approximately 15%, which leads to a 15% drop of winding loss.

Embodiments have been described with reference to different subject matters. In particular, some embodiments have been described with reference to apparatus and structure, whereas other embodiments have been described with reference to method and function. However, a person skilled in the art will gather from the above and the following description that, unless otherwise notified, in addition to any combination of features belonging to one type of subject matter also any combination between features relating to different subject matters, in particular between features of the apparatus and structure and features of the method and function is considered as to be disclosed with this application.

BRIEF DESCRIPTION

Some of the embodiments will be described in detail, with reference to the following figures, wherein like designations denote like members, wherein:

FIG. 1A shows a schematical view of an embodiment of a tubular body for an electrical machine;

FIG. 1B shows an enlarged view of an embodiment of a first tooth and a second tooth of the tubular body as shown in FIG. 1A;

FIG. 2A shows a schematical view of an embodiment of a tubular body for an electrical machine;

FIG. 2B shows an enlarged view of an embodiment of a first tooth and a second tooth of the tubular body shown in FIG. 2A;

DETAILED DESCRIPTION

Figure 3:
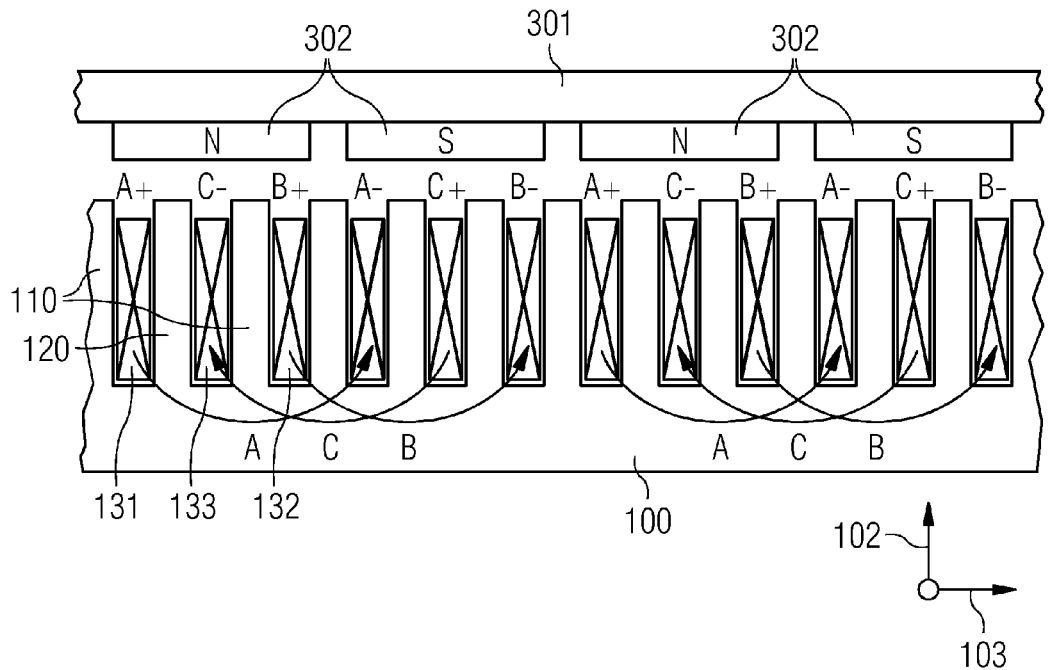
FIG. 3 to FIG. 5 show exemplary embodiments of rotor/stator arrangements.

The illustrations in the drawings are schematic. It is noted that in different figures similar or identical elements are provided with the same reference signs.

FIG. 1A and FIG. 1B show an exemplary embodiment of a tubular body 100 for an electrical machine. The tubular body 100 may be for example a rotor or a stator for the electrical machine 100. The tubular body 100 comprises a tubular shape which has a curved surface area 101. The curved surface area 101 may be a radially inner surface or a radially outer surface of the tubular body 100.

In the exemplary embodiment shown in FIG. 1A and FIG. 2A, the curved surface area 101 is a radially outer surface. The tubular body 100 is arrangeable with respect to a further tubular body such that the tubular body 100 or the further tubular body is rotatable with respect to each other around a rotary axis 105.

If the tubular body 100 is a stator, the stator comprises a centre axis which is generally coaxial with a rotary axis 105 of the rotor of the electrical machine. Around the rotary axis 105 and for example along the curved surface area 101, the circumferential direction 103 is defined. Furthermore, a radial direction 102 runs from the tubular body 100 through the rotary axis 105, wherein the radial direction 102 is perpendicular to the circumferential direction 103 and the rotary axis 105 and runs through the rotary axis 105.

The tubular body 100 further comprises first teeth 110 and second teeth 120. The first teeth 110 and the second teeth 120 are arranged onto the curved surface area 101 along the circumferential direction 103 one after another in an alternating manner. The first teeth 110 and the second teeth 120 extend from the curved surface area 101 along the radial direction 102. The first teeth 110 and the second teeth 120 are spaced apart from each other along the circumferential direction 103 and form respective slots between each other.

Specifically, at least one first tooth 110 comprises a respective first circumferential side wall 113 facing a second circumferential side wall 123 of a respective second tooth 120. The first circumferential side wall 113 comprises a first section 111 which is parallel with the second circumferential side wall 123 such that a circumferential distance 104 between the first section 111 and the second circumferential side wall 123 is constant along the radial direction 102. Hence, a slot section of the slot between the first section 111 and the second circumferential side wall 123 comprises a constant circumferential distance 104.

For sake of clarity, only one first tooth 110 and only one second tooth 120 is explained with reference signs, whereas the other first and second teeth 110, 120 may be formed in a similar manner.

In the exemplary embodiment in FIG. 1A and FIG. 1B, the second teeth 120 comprise a constant circumferential third width w3 along the radial direction 102. Hence, the third width w3 close to the curved surface area 101 and at the free end of the second tooth 120 is similar.

On the other side, the first teeth 110 comprise respective first sections 111 which are aligned in such a way, that the slots between the first section 111 of the first circumferential side wall 113 and the second circumferential side wall 123 comprise a constant circumferential distance 104 along the radial direction 102. In other words, the first section 111 of the first circumferential side wall 113 is parallel with the second circumferential side wall 123.

This is shown more in detail in FIG. 1B. The dotted line illustrates the radial direction 102 which runs from a point onto the first section 111 through the rotary axis 105. The first section 111 of the first circumferential side wall 113 is parallel with the second circumferential side wall 123. In other words, the first section 111 is arranged within a plane which is non-parallel with the radial direction 102 running from a point onto the first section 111 to the rotary axis 105 (see dotted lines for the radial direction 102). In other words, a normal of the plane which is defined by the first section 111 is not rectangular with the radial direction 102.

Along the radial extension of the first tooth 110, the first tooth may comprise the first section 111 and a further first section 112. In the exemplary embodiment shown in FIG. 1A and FIG. 1B, the first section 111 is located between the curved surface area 101 and the further first section 112.

A further first circumferential side wall 114, which is arranged at an opposed circumferential side wall with respect to the first circumferential side wall 113 of the first tooth 110, comprise a third section 115. The third section 115 may be again parallel with a further second circumferential side wall 124 of an adjacent second tooth 120.

The first teeth 110 may be formed as shown in FIG. 1A and FIG. 1B. The radially outer second sections 112 and the oppositely arranged further third sections 116 of the first teeth 110 may extend along a radial direction 102 which radial direction 102 runs from a point of the respective sections 112, 116 to the rotary axis 105. Hence, in the exemplary embodiment shown in FIG. 1A and FIG. 1B, the further first section 112 and the further third section 116 of the first teeth 110 are non-parallel with respective adjacent second circumferential side walls 123, 124 of circumferentially adjacent second teeth 120. Hence, a first width w1 along the circumferential direction 103 of the first tooth 110 between the further first section 112 and the further third section 116 is larger than the second width w2 along the circumferential direction 103 at a bottom area of the first teeth 110.

As can be taken from FIG. 1A and FIG. 1B, between the respective first and second teeth 110, 120, the slots are formed. Respective windings 131, 132, 133 are arranged inside the slots. The run of the respective windings 131, 132, 133 is indicated by the arrows A, B, C. For example, a first winding 131 runs first around a second tooth 120, further around a first tooth 110 and runs subsequently back around the first tooth 110 to the second tooth 120. Accordingly, the second winding 132 runs along the path indicated by the arrow B and the third winding 133 runs along the path indicated by the arrow C.

Figure 6:
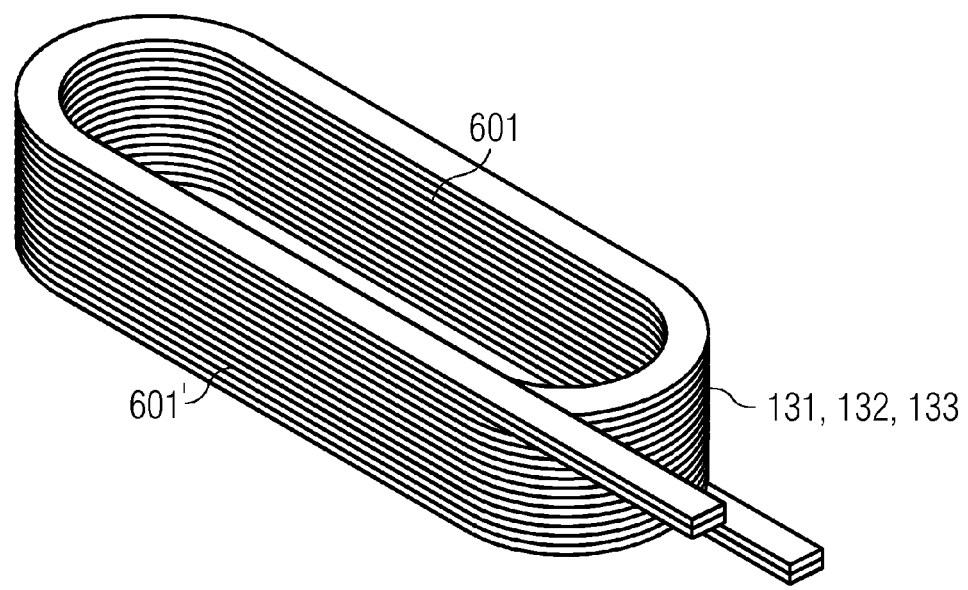
FIG. 6 shows a schematical view of an embodiment of a winding.
Figure 7:
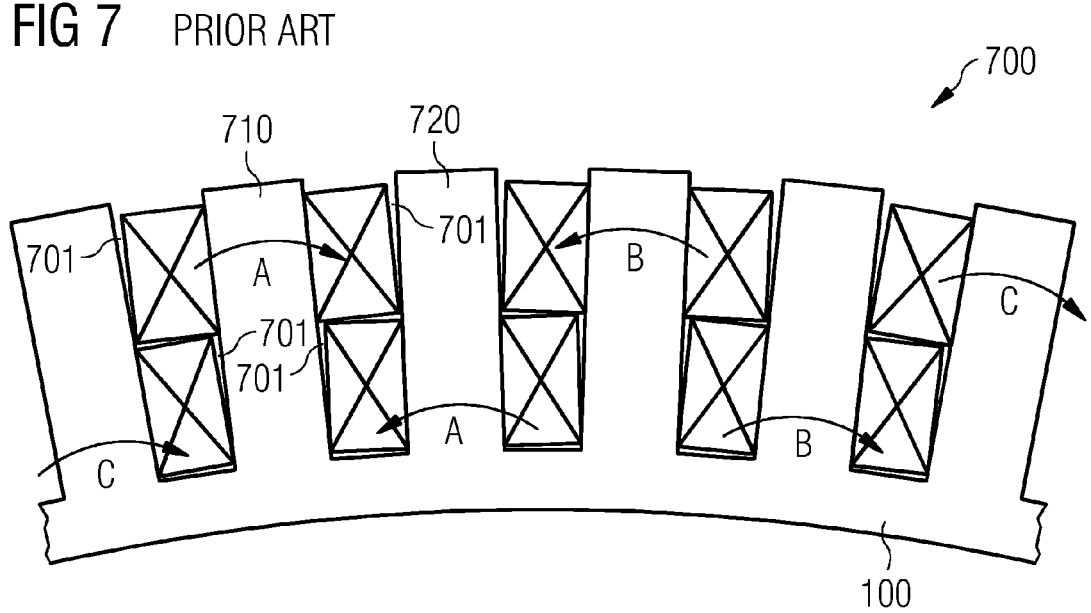
FIG. 7 shows a conventional stator of a conventional electrical machine.

The windings 131, 132, 133 comprise a rectangular cross-section (see e.g. in FIG. 6). Hence, the windings 131, 132, 133 which are arranged in a bottom area of the slot which is formed by the first section 111 and the respective second side wall 123 smoothly abuts at the respective second circumferential side wall 123 and the first section 111, so that no circumferential gap 106 exists. On the other side, the windings 131, 132, 133 which are arranged at a top region of the slot formed by the further first section 112 and the second circumferential side wall 123, a circumferential gap 106 may exist. As can be seen in FIG. 1A and FIG. 1B, such gaps 106 may occur between the respective windings 131, 132, 133 and the respective further first sections 112, the further third sections 116, the second circumferential side walls 123 and the further second circumferential side walls 124, respectively.

In other words, the circumferential width of the first tooth 110 radially reduces along the radial direction 102 from the top part with a circumferential first width w1 to a circumferential second width w2 at the bottom part of the first tooth 110 when the measurement point moves towards the slot bottom. The windings 131, 132, 133 may slide along the respective top parts of the respective teeth 110, 120 to a bottom section of the respective teeth 110, 120.

In order to generate an almost equal magnetic resistance of each tooth 110, 120, the first width w1 of the first tooth 110 between the further first section 112 and the further third section 116 may be larger than the third width w3 of the second tooth 120 between the first section 111 and the third section 115. This balances the smaller second width w2 of the first tooth 110 at the bottom part of the first tooth in comparison to the third w3 of the second tooth 120. In other words, the material mass of the first tooth 110 may be similar with the material mass of the second tooth 120, so that the equal magnetic resistance of the teeth 110, 120 is similar.

FIG. 2A and FIG. 2B show a further exemplary embodiment. The first teeth 110 are formed similar to the first teeth 110 as shown in FIG. 1A and FIG. 1B. In contrast to the exemplary embodiment shown in FIG. 1A and FIG. 1B, the second teeth 120 shown in FIG. 2A and 2B also comprise different sections 221 to 224 with different circumferential width w3, w4, w5.

The second tooth 120 comprises in the bottom section, e.g. close to the curved surface area 101, a second section 221. The second section 221 may be arranged within a plane which normal is rectangular to the radial direction 102. The oppositely located first section 111 of the first tooth 110 is parallel with the second section 221 such that the circumferential distance 104 of the slot section between the first section 111 and the second section 221 is constant.

Additionally, at a top section of the second tooth 120, the second circumferential side wall 123 comprises a further second section 222. The further second section 222 is arranged within a plane which is non-parallel with the respective radial direction 102 running from a point onto the second section 222 to the rotary axis 105. In other words, a normal of the plane along which the further second section 222 is arranged is non-perpendicular with the radial direction 102. The further first section 112 of the first tooth 110 which is arranged adjacent to the further second section 222 along the circumferential direction 103 is aligned parallel with the radial direction 102 defined from a point onto the further first section 112 to the rotary axis 105. Hence, the further first section 112 is parallel with the further second section 222 such that a circumferential distance 104 of a further slot section between the further first section 112 and the further second section 222 is constant.

The first tooth 110 comprises between the further first section 112 and an oppositely located further third section 116 of the further first side wall 114 a constant first width w1. The second circumferential width w2 close to the curved surface section 101 between the first section 111 and the third section 115 of the first tooth 110 is smaller than the first width w1 of the first tooth 110.

The second tooth 120 comprises at the free end a circumferential third width w3. At an intermediate section between the further second section 222 and the second section 221, the second tooth 120 comprises a fourth circumferential width w4 which is smaller than the third width w3. The second section 221 and the oppositely located further fourth section 224 of the second tooth 120 are each parallel with the radial direction 102. Hence, a fifth width w5 between the second section 221 and the further fourth section 224 is constant along the radial direction 102. The third width w3 may be equal or smaller with the fifth width w5. The fourth width w4 which is measured in an intermediate section between the respective further second section 222 and the second section 221 is smaller than the third width w3 and the fifth width w5.

Hence, as shown in FIG. 2A and FIG. 2B, the respective windings 131, 132, 133 arranged within respective slots at the bottom part close to the curved surface area 101 have the entire portion in direct contact so as to snugly and smoothly about the respective first section 111 and the third section 115 of the first tooth 110 and respectively the second section 221 and the further fourth section 224 of the second tooth 120.

Additionally, the windings 131, 132, 133 which are arranged within a radially outer region of the respective slots do also smoothly abut against respective further first sections 112 and further third sections 116 of the first teeth 110 and respective further second sections 222 and fourth sections 223 of the second teeth 120. Hence, a circumferential gap 106 between the respective circumferential side walls 113, 114, 123, 124 are reduced and prevented. In other words, in the exemplary embodiment shown in FIG. 2A and FIG. 2B, the second teeth 120 are divided into two radially adjacent sections, one formed by the second section 221 and the further fourth section 224 and one by further second section 222 and the fourth section 223. Accordingly, the respective slots between the first teeth 110 and the second teeth 120 are separated into an inner slot section and an outer slot section, wherein each slot section of the slot comprises an equal and constant circumferential width and distance 104.

The second teeth 120 may comprise in the exemplary embodiment shown in FIG. 2A and FIG. 2B respective edges at the interface sections between e.g. the second section 221 and the further second section 222, for example.

Figure 4:
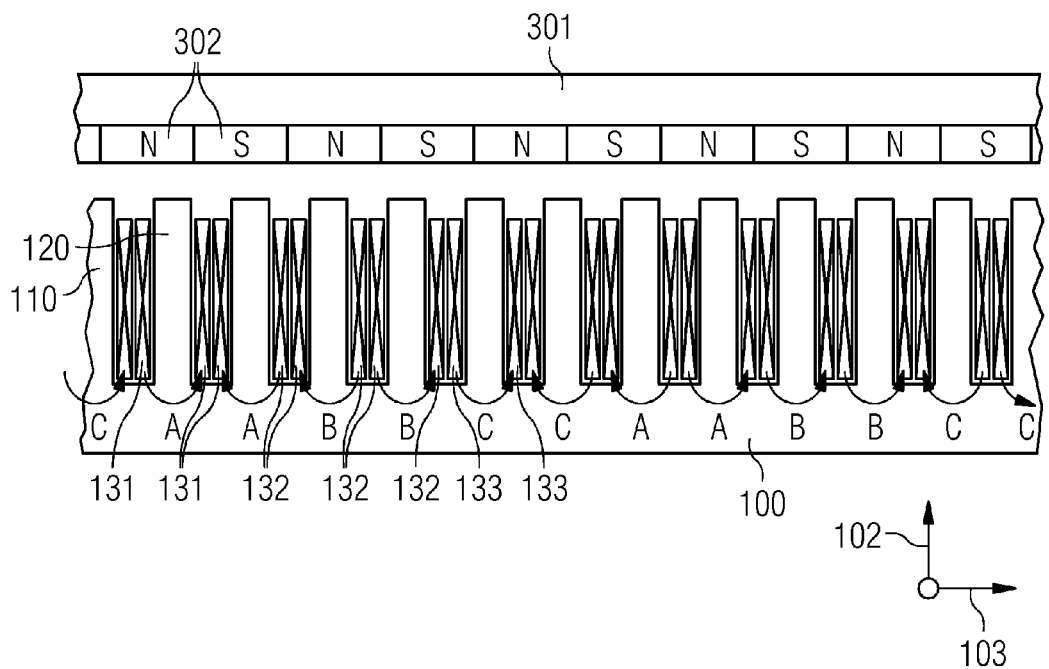
Figure 5:
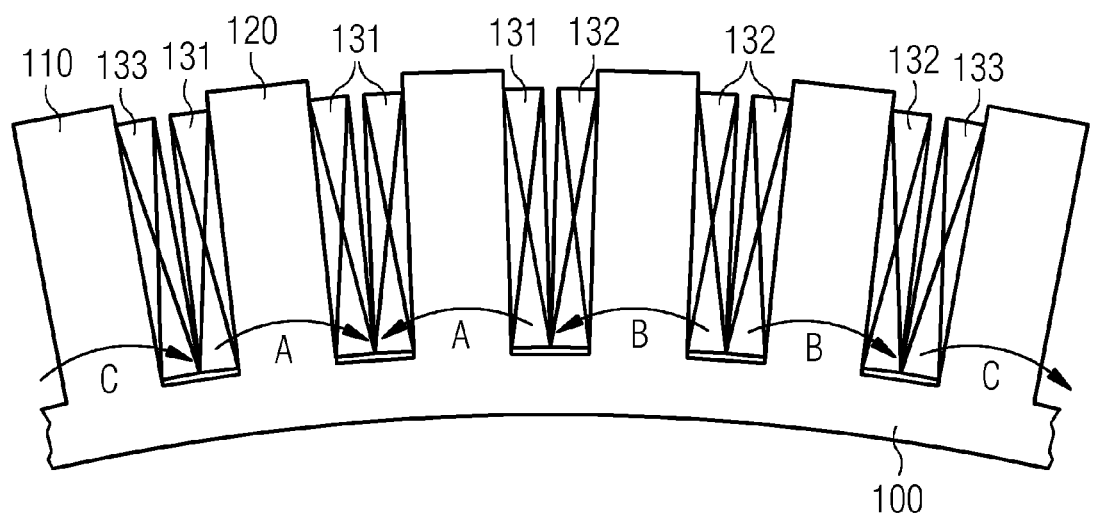

FIG. 3, FIG. 4 and FIG. 5 show exemplary embodiments of an electrical machine comprising the tubular body 100 which is a stator yoke and a rotor yoke 301. The stator yoke 100 comprises the respective teeth 110, 120, e.g. as shown in more detail in FIGS. 1A, 1B, 2A and 2B. The rotor yoke further comprises for example permanent magnets 302. For sake of clarity, the profiles of the respective teeth 110 and 120 are shown in a rectangular profile, although the respective teeth 110, 120 may have a profile as shown in FIGS. 1A, 1B, 2A and 2B.

In FIG. 3, a specific winding arrangement 131, 132, 133 is shown. The path of the respective windings 131, 132, 133 are shown by the arrows A, B, C. As shown in FIG. 3, each winding 131, 132, 133 runs through each third slot, such that each winding 131, 132, 133 overlaps with each other.

FIG. 4 shows a further exemplary embodiment of a winding arrangement of windings 131, 132, 133, wherein each winding 131, 132, 133 is wound around two adjacent teeth 110, 120. Hence, the respective windings 131, 132, 133 do not overlap each other.

FIG. 5 shows a further exemplary embodiment of the tubular body 100. FIG. 5 shows a further exemplary arrangement of windings 131, 132, 133. Each winding 131, 132, 133 is wound around two adjacent teeth 110, 120.

FIG. 6 shows an exemplary embodiment of a winding 131, 132, 133. As can be taken from FIG. 6, each winding comprises a plurality of copper coils. Furthermore, the winding 131, 132, 133 comprises a rectangular cross-section. The inner surface of the winding 131, 132, 133 forms the contact surface 601 with the respective teeth 110, 120 and the outer surface of the winding 131, 132, 133 forms the contact surface 601' with the respective teeth 110, 120.

It should be noted that the term "comprising" does not exclude other elements or steps and "a" or "an" does not exclude a plurality. Also elements described in association with different embodiments may be combined. It should also

The invention claimed is:

1. A tubular body for an electrical machine, the tubular body comprising:
   a curved surface area,
   a first tooth, and
   a second tooth,
   wherein the tubular body is arrangable with respect to a further tubular body such that one of the tubular body or the further tubular body is rotatable with respect to the other one around a rotary axis,
   wherein the first tooth and the second tooth extend from the curved surface area along a radial direction with respect to the rotary axis,
   wherein the first tooth and the second tooth are spaced apart from each other along a circumferential direction around the rotary axis,
   wherein the first tooth comprises a first side wall facing a second side wall of the second tooth, and
   wherein the first side wall comprises a first section which is parallel to the second side wall such that a circumferential distance between the first section and the second side wall is constant along the radial direction;
   wherein the first side wall comprises a further first section which is located adjacent to the first section along the radial direction and further from the rotary axis in the radial direction than the first section;
   wherein the second side wall comprises a second section which is parallel with the first section, further wherein the further first section is non-parallel with the second section such that a circumferential distance between the further first section and the second section varies along the radial direction;
   wherein the second side wall comprises a further second section which is parallel with the further first section; and
   wherein the first section and the further first section are sized such that respective windings arranged within respective section's entire portion is in direct contact with the respective first section and the further first section of the first tooth and respectively the second section and the further second section of the second tooth.

2. The tubular body according to claim 1,
   wherein the further first section is located between the curved surface area and the first section.

3. The tubular body according to claim 1,
   wherein first section is located between the curved surface area and the further first section.

4. The tubular body according to claim 1,
   a further second tooth which extends from the curved surface area along the radial direction such that the first tooth is arranged along the circumferential direction between the second tooth and the further second tooth,
   wherein the first tooth further comprises a further first side wall facing a further second side wall of the further second tooth,
   wherein the further first side wall comprises a third section which is parallel to the further second side wall such that a circumferential distance between the third section and the further second side wall is constant along the radial direction.

5. The tubular body according to claim 4, further comprising
   a plurality of first teeth, and
   a plurality of second teeth,
   wherein the plurality of first teeth and the plurality of second teeth extend from the curved surface area along the radial direction with respect to the rotary axis,
   wherein the plurality of first teeth and the plurality of second teeth are arranged one after another along the circumferential direction in an alternating manner.

6. An electrical machine, comprising
   at least one winding,
   a tubular body according to claim 5,
   wherein the at least one winding is wound around the first tooth and/or the second tooth.

7. The electrical machine according to claim 6,
   wherein the tubular body is a rotor which is rotatably arranged around the rotary axis.

8. The electrical machine according to claim 6,
   wherein the tubular body is a stator which is non-rotatable around the rotary axis.

* * * * *